United States Patent [19]

Viohl

[11] Patent Number: 4,695,477

[45] Date of Patent: Sep. 22, 1987

[54] METHOD OF PRODUCING A PLANE PHOSPHOR SCREEN

[75] Inventor: Uwe Viohl, Aichwald, Fed. Rep. of Germany

[73] Assignee: Standard Elektrik Lorenz AG, Stuttgart, Fed. Rep. of Germany

[21] Appl. No.: 752,169

[22] Filed: Jul. 3, 1985

[30] Foreign Application Priority Data

Jul. 5, 1984 [DE] Fed. Rep. of Germany ....... 3424714

[51] Int. Cl.⁴ .............................................. B05D 5/06
[52] U.S. Cl. .................................... 427/68; 427/230; 427/282; 427/287; 427/302; 427/340
[58] Field of Search ................ 427/68, 282, 230, 287, 427/302, 340

[56] References Cited

U.S. PATENT DOCUMENTS

| | | | |
|---|---|---|---|
| 3,560,254 | 2/1971 | Seddon | 427/340 |
| 3,594,207 | 7/1971 | Allie et al. | 427/68 |
| 3,672,942 | 6/1972 | Neumann et al. | 427/340 |
| 4,241,112 | 12/1980 | Kostandov et al. | 427/302 |
| 4,243,695 | 1/1981 | Wengert et al. | 427/68 |
| 4,292,107 | 9/1981 | Tanaka et al. | 427/68 |
| 4,442,138 | 4/1984 | Bich et al. | 427/302 |
| 4,452,861 | 6/1984 | Okamoto et al. | 427/68 |
| 4,776,754 | 12/1973 | Levinos | 427/68 |

*Primary Examiner*—Norman Morgenstern
*Assistant Examiner*—Janyce A. Bell
*Attorney, Agent, or Firm*—Christie, Parker & Hale

[57] ABSTRACT

In coating a smooth glass faceplate panel with phosphor to produce a phosphor screen for use with flat color picture tubes, a basic mask is placed onto the glass faceplate panel. Thereafter; one at a time, one coating mask for each respective color is placed over the basic mask and the phosphor belonging to the respective coating mask is deposited. The phosphor is dispersed in a reactive binder and meets with an activator sprayed on or otherwise applied to the glass faceplate panel.

3 Claims, No Drawings

METHOD OF PRODUCING A PLANE PHOSPHOR SCREEN

BACKGROUND OF THE INVENTION

The invention pertains to a method of phosphor coating a glass faceplate panel for use with flat color picture tubes.

From German Patent No. 28 04 127 there is known a method of producing a plane phosphor screen for use with flat color displays, in which the phosphors are used in a slurry containing solvents and further substances. By using solvents to prepare the phosphor slurry, only one processing step is required during the coating. However, subsequent to deposition, the solvent must be removed from the slurry. This leaves a phosphor layer having a rough surface. Also, the phosphor layer has no optimum packing density, and the solvents are explosive substances.

SUMMARY OF THE INVENTION

It is an object of the invention to provide a method of phosphor coating a faceplate such that an even phosphor coating is obtained.

In accordance with the invention, a basic mask is placed onto the glass faceplate and thereafter one coating mask for each respective color is placed over the basic mask. The phosphor belonging to the respective coating mask is then deposited. The phosphor is dispersed in a reactive binder and meets with an activator which is sprayed or otherwise applied to the faceplate.

By using a reactive binder and an activator there is no need to handle solvents which require special safety measures. Since nothing needs to be removed from the phosphors after their deposition, these exhibit a smooth surface and a good volumetric efficiency, which prevents the color from superposing each other. By this, and by the extremely good adherence of the phosphors on the glass faceplate panel it is possible to achieve narrow stripe widths or small phosphor dot diameters.

The activator may either be deposited on to the glass faceplate panel in the first place or each phosphor layer may be sprayed therewith.

The binder is preferably a monomer methacrylic acid ester as is sold, for example, by the firm of Henkel under the tradename Metallon LA 2002. The associated activator of the firm Henkel is designated LA 5202.

DETAILED DESCRIPTION

The invention will now be explained in greater detail with reference to an illustrative embodiment.

The activator is uniformly sprayed on to the plane glass faceplate panel which has been previously treated in the conventional way, and is then dried. The activator is the aforementioned LA5202 which has the following properties: light blue liquid having a density of 0.8 to 0.9, 20% solid matter and low viscosity. Further properties of the activator may be determined from "Technische Informatiohen, Metallon LA2002-21 mit Aktivator LA5202-21, from Henkel, Dusseldorf, October 1977. In the next step, the basic mask is placed on to the glass faceplate panel, with the first coating mask, for example, for the green-emitting phosphor, being applied thereabove. On this the following slurry is poured uniformly, with the excess material being removed by way of sweeping or scraping:

200 g green-emitting phosphor of the type Zn, CdS, (Cu, Al) dispersed in
1000 g reactive binder as stated.

After the slurry has been allowed to cure, the first coating mask is removed and the second coating mask, for example, for the blue-emitting phosphor, is applied. Then the following slurry is uniformly poured on to the coating mask, and the excess material is removed by way of sweeping or scraping:

200 g blue-emitting phosphor of the type ZnS, Ag, dispersed in
1000 g reactive binder as stated.

When this slurry has cured, the process is repeated with the third coating mask for the red-emitting phosphor. In this process 250 g red-emitting phosphor of the type $Y_2O_2S$, Eu is dispersed in
1000 g reactive binder as stated.

When this slurry has also cured, both the coating mask and the basic mask are removed and the thus produced phosphor screen is forwarded to the station applying the varnish and the aluminum coats.

For flat color picture tubes employing a black matrix layer, a matrix mask is placed on the smooth glass faceplate panel prior to the application of the basic mask, and the following slurry is uniformly poured thereover, with the excess material being removed by way of sweeping or scraping:

100 g graphite having a granular size of 0.05 mm is dispersed in
1000 g reactive binder as stated.

After the curing, the matrix mask is removed and the basic mask is placed in position, and the screen-coating is carried out as described hereinbefore.

Instead of first coating the smooth glass faceplate panel with the activator, the latter may also be sprayed thereon after each deposition of the slurries.

What is claimed is:

1. A method of coating a smooth glass faceplate to produce a phosphor screen for use with flat color picture tubes comprising the steps of:
   placing a basic mask on the faceplate;
   applying a coating mask for a first color;
   depositing a first layer of phosphor dispersed in a reactive binder;
   causing said first layer to meet with an activator on said faceplate, said activator causing said binder to harden;
   applying a coating mask for a second color;
   depositing a second layer of phosphor dispersed in a reactive binder;
   causing said second layer to meet with said activator on said faceplate;
   applying a coating mask for a third color;
   depositing a third layer of phosphor dispersed in a reactive binder; and
   causing said third layer to meet with said activator on said faceplate;
   wherein said activator may either be deposited on said faceplate prior to the deposition of said basic mask, or may be sprayed upon said faceplate with each of said phosphor layers.

2. A method of coating a smooth glass faceplate to produce a phosphor screen for use with flat color picture tubes comprising the steps of:
   placing a basic mask on said faceplate;
   applying a coating mask for a first color;

depositing a first layer of phosphor dispersed in a reactive binder wherein said binder consists of a monomer methacrylic acid ester;

causing said first layer to meet with an activator on said faceplate, said activator causing said binder to harden;

applying a coating mask for a second color;

depositing a second layer of phosphor dispersed in said reactive binder;

causing said second layer to meet with said activator on said faceplate;

applying a coating mask for a third color;

depositing a third layer of phosphor dispersed in said reactive binder; and causing said third layer to meet with said activator on said faceplate;

wherein said activator may either be deposited on said faceplate prior to the deposition of said basic mask, or may be sprayed upon said faceplate with each of said phosphor layers.

3. A method of coating a smooth glass faceplate to produce a phosphor screen for use with flat color picture tubes comprising the steps of:

placing a basic mask on said faceplate;

applying a coating mask for a first color;

depositing a first layer of phosphor dispersed in a reactive binder, wherein said binder consists of a monomer methacrylic acid ester;

causing said first layer to meet with said activator on said faceplate, said activator causing said binder to harden;

applying a coating mask for a second color;

depositing a second layer of phosphor dispersed in said reactive binder;

causing said second layer to meet with said activator on said faceplate;

applying a coating mask for a third color;

depositing a third layer of phosphor dispersed in said reactive binder; and causing said third layer to meet with said activator on said faceplate;

wherein 200 g green-emitting phosphor or 220 g blue-emitting phosphor or 250 g red-emitting phosphor is dispersed in 1000 g binder when the green-emitting phosphor consists of Zn, CdS, (Cu, Al), the blue-emitting phosphor consists of ZnS, Ag, and when the red-emitting phosphor consists of $Y_2O_2S$, Eu, respectively.

* * * * *